(12) United States Patent
Schroeder et al.

(10) Patent No.: US 6,700,875 B1
(45) Date of Patent: Mar. 2, 2004

(54) SYSTEM, DEVICE, AND METHOD FOR SELECTING A CHANNEL IN A MULTICHANNEL COMMUNICATION NETWORK

(75) Inventors: Stephen Schroeder, Stoughton, MA (US); Keith M. Conger, Foxborough, MA (US); Richard Wade, Mansfield, MA (US); Michael Jaimie Cooper, Marietta, GA (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/052,224

(22) Filed: Mar. 31, 1998

(51) Int. Cl.[7] ............................... H04J 1/16; H04J 3/16
(52) U.S. Cl. ...................................... 370/252; 370/437
(58) Field of Search .................. 370/248, 249, 370/251, 252, 329, 330, 332, 431, 432, 437, 253, 9, 241, 242, 247; 725/111, 112, 118, 124, 138, 144, 148; 455/67.1, 62, 423, 425, 450, 464; 375/224; 379/29.01

(56) References Cited

U.S. PATENT DOCUMENTS

| | | | | |
|---|---|---|---|---|
| 5,551,064 A | * | 8/1996 | Nobbe et al. ................. 455/62 |
| 5,699,365 A | * | 12/1997 | Klayman et al. ............ 714/708 |
| 5,740,534 A | * | 4/1998 | Ayerst et al. ............... 340/7.42 |
| 5,790,523 A | * | 8/1998 | Ritchie, Jr. et al. ......... 370/241 |
| 5,802,446 A | * | 9/1998 | Giorgi et al. ................. 370/252 |
| 5,805,992 A | * | 9/1998 | Schellinger .................. 455/410 |
| 5,862,451 A | * | 1/1999 | Grau et al. ................... 725/116 |
| 5,946,374 A | * | 8/1999 | Bower ....................... 379/29.01 |
| 6,028,845 A | * | 2/2000 | Serikawa et al. ............ 370/249 |
| 6,169,728 B1 | * | 1/2001 | Perreault et al. ............ 370/253 |

\* cited by examiner

Primary Examiner—Chau Nguyen
Assistant Examiner—Andy Lee
(74) Attorney, Agent, or Firm—Mayer Fortkort & Williams, PC; Karin L. Williams, Esq.

(57) ABSTRACT

In a system, device, and method for selecting a channel from among a plurality of channels, a number of available channels are selected for testing. A channel quality measurement is made for each of the number of available channels. The channel having the best channel quality measurement is then selected. To make the channel quality measurements, a primary station selects a channel to be tested and also selects a secondary station with which to perform the test. The primary station transmits a control frame to the selected secondary station, including a channel identifier identifying the selected channel. Upon receiving the control frame, the selected secondary station adjusts its transmitter to the selected channel based on the channel identifier in the control frame, and transmits a reference signal on the selected channel. Meanwhile, the primary station adjusts its receiver to the selected channel and receives the reference signal from the selected secondary station. The primary station then measures the quality of the received reference signal.

36 Claims, 4 Drawing Sheets

SYSTEM, DEVICE, AND METHOD FOR SELECTING A CHANNEL IN A MULTICHANNEL COMMUNICATION NETWORK

BACKGROUND

1. Field of the Invention

The invention relates generally to communication systems, and more particularly to selecting a channel in a multichannel communication network based on channel quality.

2. Discussion of Related Art

In today's information age, there is an increasing need for high-speed communication networks that provide Internet access and other on-line services for an ever-increasing number of communications consumers. To that end, communications networks and technologies are evolving to meet current and future demands. Specifically, new networks are being deployed which reach a larger number of end users, and protocols are being developed to utilize the added bandwidth of these networks efficiently.

One technology that has been widely deployed and will remain important in the foreseeable future is the multichannel communication network. A multichannel communication network is one that supports a number of separate communication channels. Typically, each communication channel is one of a number of frequency bands carried over a shared physical medium such as a hybrid fiber-optic/coaxial cable (HFC) network or wireless network.

One type of multichannel communication network includes a single primary station coupled to a plurality of secondary stations over the shared physical medium in a point-to-multipoint configuration. Typically, the primary station transmits to the secondary stations over a single communication channel, and the secondary stations transmit to the primary station over one or more shared communication channels. The primary station controls the secondary station transmissions using control messages that authorize a specified secondary station or group of secondary stations to transmit on a specified communication channel.

One desirable feature of such a multichannel communication network is the ability to dynamically switch the secondary station transmissions among the shared communication channels (often referred to as "frequency agility" or "frequency hopping"). Frequency agility allows the primary station to spread the secondary station transmissions across multiple channels to control network congestion (often referred to as "load balancing"). Frequency agility also allows the primary station to avoid channels that are unusable due to excessive distortion or equipment failure.

In order to support frequency agility, the primary station typically maintains a list of available communication channels. When the primary station needs to select a communication channel, either for load balancing or to avoid an unusable channel, the primary station'selects one of the available communication channels from the list. At that time, the primary station has no way of knowing whether or not the selected communication channel is usable. If the selected communication channel is in fact unusable, any scheduled transmission on the selected communication channel will be lost, and the primary station will be forced to select another available communication channel. Therefore, a system, device, and method for selecting a communication channel based on channel quality is desirable.

DETAILED DESCRIPTION

Figure 1:
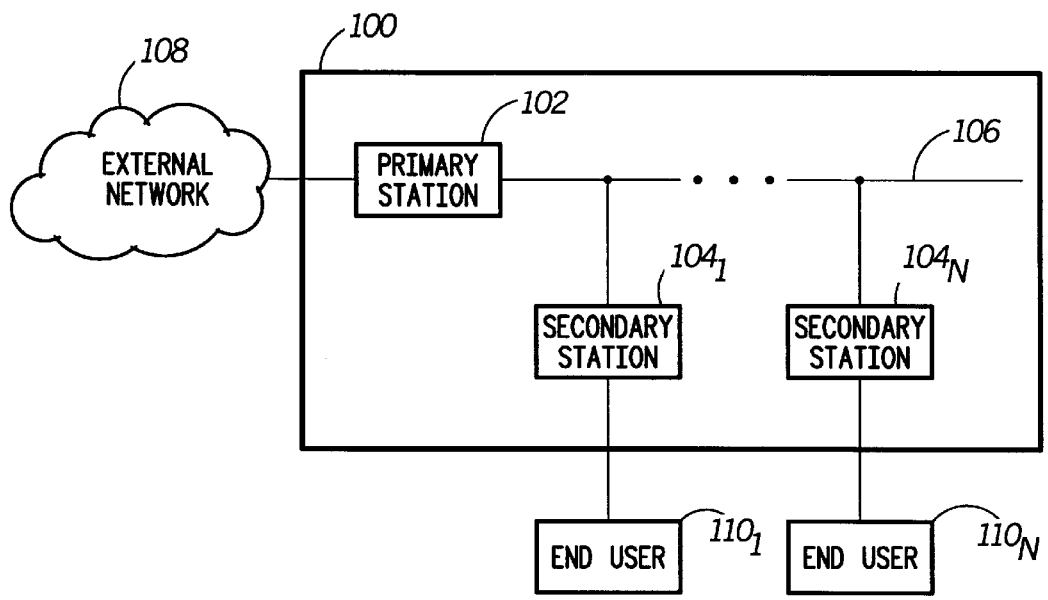
FIG. 1 shows a multichannel communication network in accordance with a preferred embodiment of the present invention.

FIG. 1 shows a multichannel communication network 100 in accordance with a preferred embodiment of the present invention. The multichannel communication network 100 allows a number of end users 110, through $110_N$ to access a remote external network 108 such as the Internet. The multichannel communication network 100 acts as a conduit for transporting information between the end users 110 and the external network 108.

The multichannel communication network 100 includes a primary station 102 that is coupled to the external network 108. The primary station 102 is in communication with a plurality of secondary stations $104_1$ through $104_N$ (collectively referred to as "secondary stations 104" and individually as a "secondary station 104") by means of a shared physical medium 106. Each end user 110 interfaces to the multichannel communication network 100 by means of a secondary station 104.

The shared physical medium 106 includes a plurality of channels over which information can be transferred between the primary station 102 and the secondary stations 104. In the preferred embodiment, each channel is unidirectional; that is, a particular channel either carries information from the primary station 102 to the secondary stations 104 or from the secondary stations 104 to the primary station 102. Those channels that carry information from the primary station 102 to the secondary stations 104 are typically referred to as "downstream channels." Those channels that carry information from the secondary stations 104 to the primary station 102 are typically referred to as "upstream channels." In alternative embodiments, these various upstream and downstream channels may, of course, be the same physical channel, for example, through time-division multiplexing/duplexing, or separate physical channels, for example, through frequency-division multiplexing/duplexing.

In the preferred embodiment, the multichannel communication network 100 is a data-over-cable (DOC) communication system wherein the shared physical medium 106 is a hybrid fiber-optic and coaxial cable (HFC) network. The primary station 102 is a headend device typically referred to as a "cable router." The secondary stations 104 are cable modems. In other embodiments, the shared physical medium 106 may be coaxial cable, fiber-optic cable, twisted pair wires, and so on, and may also include air, atmosphere, or space for wireless and satellite communication.

In the multichannel communication network 100, the downstream channels are situated in a frequency band above approximately 50 MHz. The downstream channels are classified as broadcast channels, since any information transmitted by the primary station 102 over a particular downstream channel reaches all of the secondary stations 104. Any of the secondary stations 104 that are tuned to receive on the particular downstream channel can receive the information.

In the multichannel communication network 100, the upstream channels are situated in a frequency band between approximately 5 through 42 MHz. The upstream channels are classified as shared channels, since only one secondary station 104 can successfully transmit on a particular upstream channel at any given time, and therefore the upstream channels must be shared among the plurality of secondary stations 104. If more than one of the secondary stations 104 simultaneously transmit on a particular upstream channel, there is a collision that corrupts the information from all of the simultaneously transmitting secondary stations 104.

In order to allow multiple secondary stations 104 to share a single upstream channel, the primary station 102 and the secondary stations 104 participate in a medium access control (MAC) protocol. A number of different MAC protocols have been developed for use in the DOC communication system. These protocols can generally be categorized as contention-free protocols and contention-based protocols. Contention-free protocols, such as time-division multiple-access (TDMA) and round-robin polling, avoid collisions on the shared channel by means of various scheduling methods by authorizing only one secondary station to transmit on an upstream channel at a time. Contention-based protocols, such as certain reservation-based protocols, do not avoid collisions but instead resolve any collisions that do occur on the shared channel. In the preferred embodiment, the MAC protocol uses a combination of polling and contention-based reservation for scheduling upstream transmissions by the secondary stations 104.

The frequency band within which the upstream channels are situated makes the upstream channels prone to interference by outside sources such as certain home electrical appliances and HAM radio, which often emit radio frequency (RF) energy in the 5–42 MHz frequency band. Thus, it is not uncommon for certain upstream channels.to become unusable due to excessive outside interference while other upstream channels remain usable. Still other upstream channels may become unusable due to an equipment failure such as a defective receiver in the primary station 102.

In a preferred embodiment, the primary station 102 monitors each active upstream channel (i.e., each upstream channel on which data is being transmitted) to determine whether the channel remains usable or has become unusable. For each active upstream channel, the primary station 102 maintains a channel quality measurement that provides an estimate of the channel quality at any given time. As long as the channel quality measurement remains within a predetermined range, the channel is considered to be usable. If the channel quality measurement exceeds a predetermined threshold, however, the channel is considered to be unusable.

One channel quality measurement technique used by the primary station 102 involves calculating a packet error rate for the upstream channel. The packet error rate is a measure of the total number of packets received on the upstream channel relative to the number of packets received in error. If the packet error rate exceeds a predetermined threshold, then the upstream channel is considered to be unusable.

Another channel quality measurement technique used by the primary station 102 involves calculating a carrier-to-total-distortion (CTD) ratio for each burst transmission on the upstream channel. The total distortion level includes noise as well as distortion (including group delay distortion, amplitude distortion, micro-reflections, and other types of distortion), and is measured using a mean squared error technique. The mean squared error is a measure of the amount of distortion affecting the modulated symbols during the burst transmission. If the CTD ratio averaged over a predetermined number of symbols exceeds a predetermined threshold, then the upstream channel is considered to be unusable.

The CTD ratio calculation has certain attributes that make it preferable to the packet error rate calculation. For one, the CTD ratio calculation is a more accurate channel quality indicator than the packet error rate calculation, since it measures distortion of the actual modulated symbols. Also, the CTD ratio calculation is capable of measuring channel quality based on a single burst transmission, where the packet error rate typically requires measurement over multiple burst transmissions. Furthermore, the CTD ratio calculation permits detection of channel quality degradation before actual data loss occurs, allowing preemptive actions to be taken. Finally, the CTD ratio calculation is largely independent of modulation mode.

U.S. Pat. No. 5,699,365 entitled APPARATUS AND METHOD FOR ADAPTIVE FORWARD ERROR CORRECTION IN DATA COMMUNICATIONS, issued on Dec. 16, 1997 to applicants Jeffrey T. Klayman, John A. Perreault, Katherine Unger, and Stephen Schroeder, assigned to the same assignee of the present application, and incorporated herein by reference in its entirety, teaches one technique for overcoming excessive outside interference. Klayrrian et. al. teach an adaptive scheme in which forward error correction, modulation, and other encoding techniques used on the upstream channel to compensate for outside interference are adapted based on the amount of outside interference present on the upstream channel. The adaptive scheme allows certain upstream channels to remain usable even in the presence of excessive outside interference, albeit at a reduced data throughput rate.

In situations where a particular upstream channel is deemed unusable, upstream communications must be moved from the unusable upstream channel to an alternate upstream channel. In a known prior art embodiment, the primary station 102 maintains a list of available upstream channels, and selects one of the available upstream channels from the list as an alternate upstream channel. The alternate upstream channel is selected without regard for relative channel quality. Therefore, it is conceivable that the selected alternate channel is also unusable due to outside interference, in which case the primary station 102 selects yet another alternate upstream channel. Thus, there has remained a need for a technique for selecting an alternate upstream channel based on relative channel quality.

A preferred embodiment of the present invention comprises a system, device, and method for selecting such an alternate upstream channel from among a plurality of available upstream channels based on relative channel quality. The primary station 102 maintains a list of available upstream channels. When the primary station 102 needs to select an alternate upstream channel, for example, due to excessive outside interference on a particular upstream channel, the primary station 102 first selects a number of the available upstream channels to be tested. The primary station 102 then tests each of the selected available upstream channels by measuring a channel quality for each of the number of available upstream channels. Finally, the primary station 102 selects as the alternate channel the one available upstream channel having the best channel quality.

Figure 2:
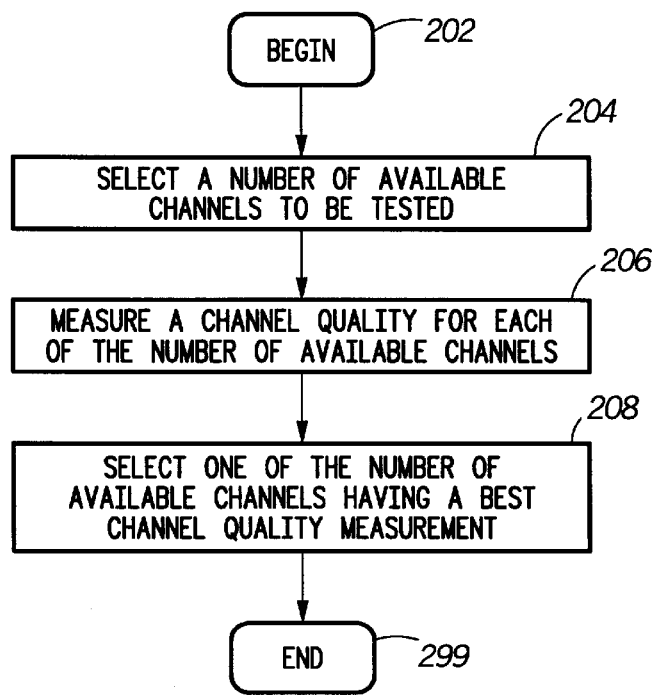
FIG. 2 is a flow chart showing a method for selecting an alternate upstream channel in accordance with a preferred embodiment of the present invention.

FIG. 2 shows a method 200 for selecting an alternate upstream channel in accordance with a preferred embodiment of the present invention. The method 200 begins in step 202, and proceeds to select a number of available upstream channels from among the plurality of upstream channels in the communication network, in step 204. The method 200 then measures a channel quality for each of the number of available upstream channels, in step 206. Lastly, the method 200 selects one of the number of available upstream channels having a best channel quality measurement relative to the other available upstream channels, in step 208. The method 200 terminates in step 299.

Figure 3:
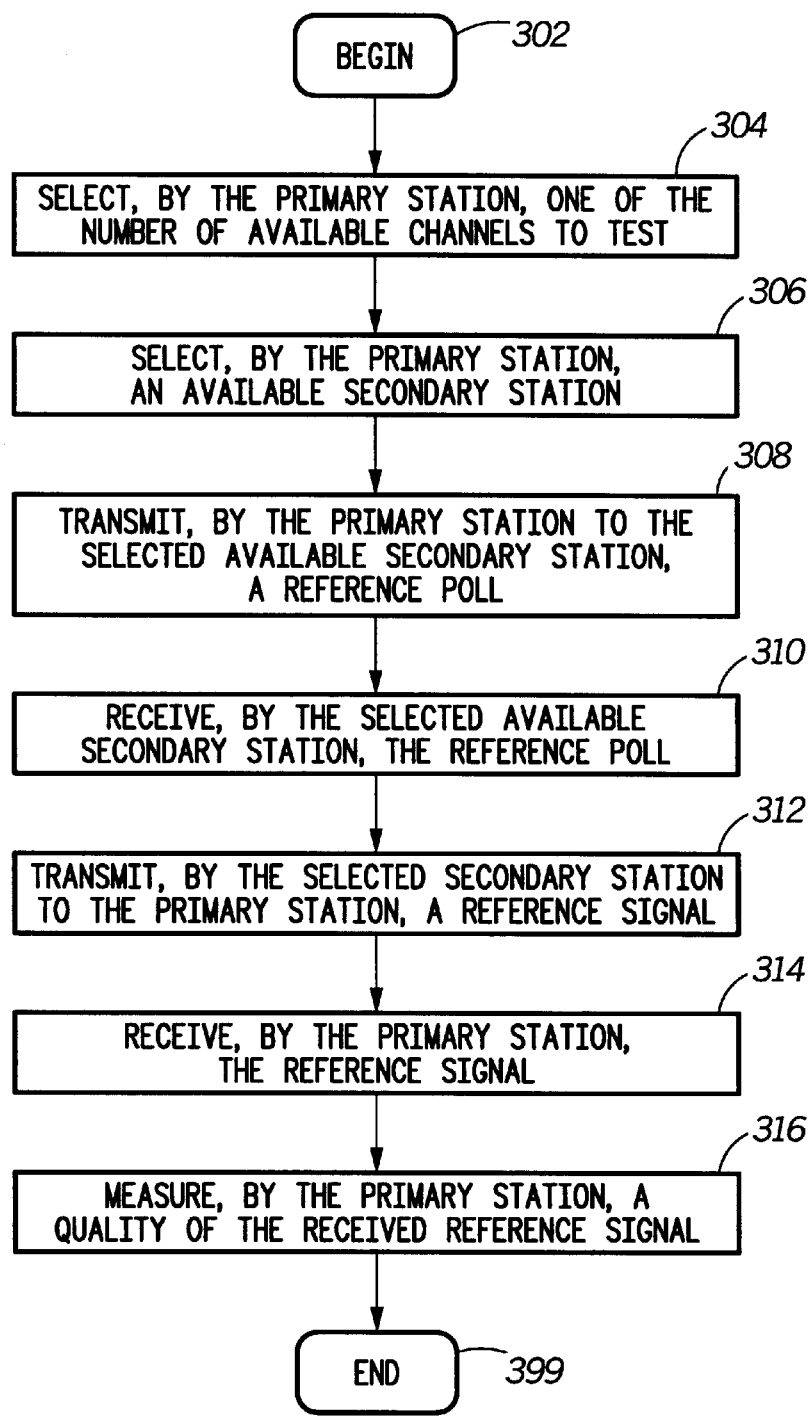
FIG. 3 is a flow chart showing a method for measuring the channel quality of a selected available upstream channel in accordance with a preferred embodiment of the present invention.

FIG. 3 shows a method 300 for measuring the channel quality for each of the number of available upstream channels in accordance with step 206 of the preferred embodiment of the present invention. The method 300 begins in step 302, and proceeds to step 304. In step 304, the primary station 102 selects one of the number of available upstream channels to test. In step 306, the primary station 102 selects an available secondary station 104 with which to test the selected available upstream channel. The primary station 102 then transmits a special control frame (referred to as a "reference poll") to the selected available secondary station 104, in step 308. The reference poll is distinguishable from other types of control frames by a unique frame identifier, and includes, among other things, a channel identifier for identifying the selected available upstream channel and a modulation mode indicator for indicating a modulation mode.

Upon receiving the reference poll in step 310, the selected available secondary station 104 adjusts its transmitter to the selected available upstream channel and transmits a predetermined reference signal on the selected available upstream channel using the specified modulation mode and a predetermined set of encoding parameters, in step 312. In the preferred embodiment, the modulation mode is a form of phase shift keying known as π/4 Differential Quadrature Phase Shift Keying (π/4 DQPSK), although the modulation mode can also be any of a number of alternative modulation modes including 16-point Quadrature Amplitude Modulation (16QAM). Also, in the preferred embodiment, the encoding parameters include scrambling and block coding.

Meanwhile, the primary station 102 adjusts its receiver to the selected available upstream channel and receives the reference signal on the selected available upstream channel, in step 314. The primary station 102 then measures a quality of the received reference signal, in step 316, and terminates in step 399. The method 300 is repeated for each of the number of available upstream channels, and the method 300 may be performed concurrently on a plurality of the available upstream channels using a different secondary station 104 for testing each of the plurality of available upstream channels.

Figure 4:
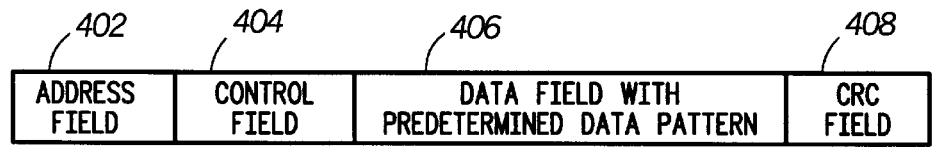
FIG. 4 is a block diagram showing the format of the reference signal frame in accordance with a preferred embodiment of the present invention.

In the preferred embodiment, the reference signal consists of a special frame (referred to as a "reference signal frame"). The reference signal frame is designed specifically for the channel quality measurement. The format of the reference signal frame is shown in FIG. 4. Reference signal frame 400 includes an address field 402, a control field 404, a data field 406, and a cyclic redundancy check (CRC) field 408. The address field 402 is a 16-bit field used to indicate a secondary station address. The control field 404 is a 16-bit field used to indicate, among other things, a frame type. The data field 406 is a 128-byte field used to carry a predetermined data pattern. In the preferred embodiment, the predetermined data pattern is an eight-byte sequence equal to 0x0123456789ABCDEF ("0" denoting a hexadecimal value) repeated sixteen times. The predetermined data pattern is designed to equally exercise all or substantially all of the signal points of the underlying modulation mode whether the reference signal frame is transmitted scrambled (as in the preferred embodiment) or unscrambled. The CRC field 408 is a 16-bit field used to indicate a cyclic redundancy check calculated over the fields 402, 404, and 406.

Referring again to FIG. 3, the channel quality measurement of step 316 is made by calculating a CTD ratio during the burst transmission of the reference signal frame 400. The CTD ratio is calculated using the mean squared error technique described above. The CTD ratio calculation begins after a predetermined number of symbols following detection of the burst transmission by the primary station 102. Because the reference signal frame 400 is designed to equally exercise all or substantially all of the signal points of the underlying modulation scheme, the CTD ratio calculation involves substantially all of the modulation signal points. Therefore, the CTD ratio is an indicator of the channel quality across substantially the entire frequency band of the upstream channel.

In the preferred embodiment, the channel quality measurement for each available upstream channel is made at the time an alternate channel needs to be selected. The channel quality measurement for each available upstream channel can also be made periodically or on an ongoing basis and the result stored in a memory (not shown). In this way, the primary station 102 will already have the channel quality measurements at the time an alternate channel needs to be selected.

The channel quality measurement technique of the present invention can also be used for regularly monitoring a group of active upstream channels. Periodically, or whenever scheduled, the primary station 102 suspends data transmissions on the group of upstream channels and performs the channel quality measurement for each upstream channel in the group. Based on the channel quality measurements, the primary station 102 resumes data transmissions on the upstream channels using the upstream channel(s) having the best channel quality measurement(s). By regularly monitoring the group of upstream channels, the primary station 102 may be able to predict and proactively react to changing channel characteristics.

The primary station 102 initiates the channel quality measurement. The primary station 102 includes logic for selecting a number of available channels from among a plurality of channels in the communication network. The primary station 102 also includes logic for measuring a channel quality for each of the number of available channels. The primary station 102 further includes logic for selecting one of the number of channels having a best channel quality measurement relative to the other available channels.

Figure 5:
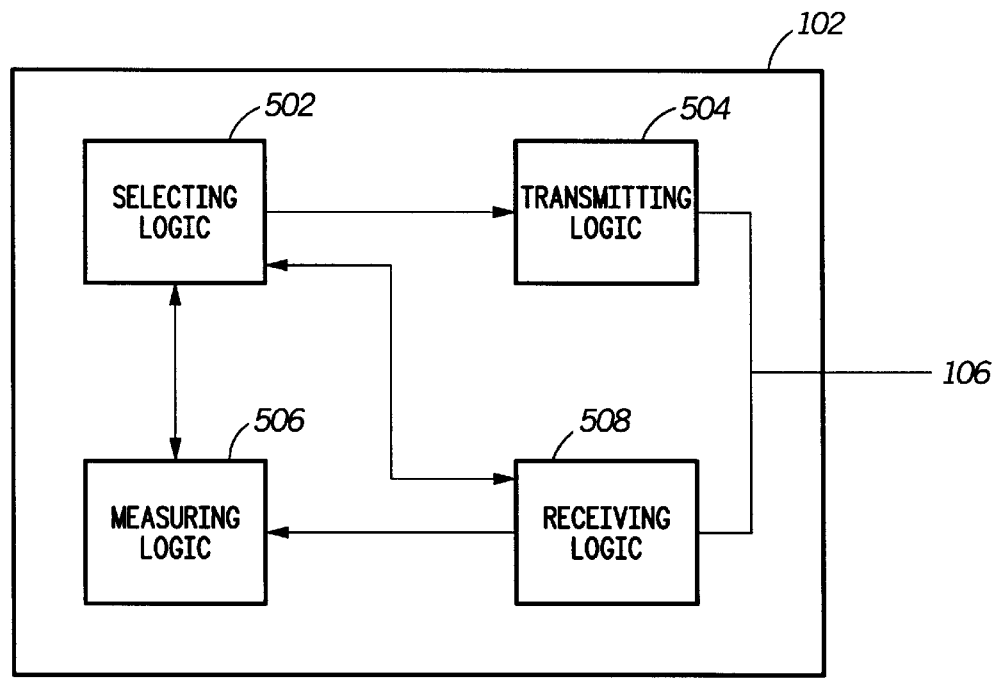
FIG. 5 is a block diagram of a primary station in accordance with a preferred embodiment of the present invention.

As shown in FIG. 5, the primary station 102 includes selecting logic 502 including, among other things, logic for selecting a number of available upstream channels from among the plurality of upstream channels in the multichannel communication network. The selecting logic 502 further includes logic for selecting one of the number of available channels to be tested and logic for selecting an available secondary station with which to test the selected channel.

The primary station 102 also includes transmitting logic 504 coupled to the shared physical medium 106 and to the selecting logic 502. The transmitting logic 504 obtains from the selecting logic 502 information regarding the selected available channel and the selected available secondary station. The transmitting logic 502 transmits a control frame to the selected available secondary station over the shared physical medium 106. The control frame includes, among other things, a channel identifier for identifying the selected available channel and a modulation mode indicator for indicating a modulation mode.

The primary station 102 further includes receiving logic 508 coupled to the shared physical medium 106 and to the selecting logic 502. The receiving logic 508 obtains from the selecting logic 502 information regarding the selected available channel and the selected available secondary station. The receiving logic 508 adjusts its receiver to the selected available channel and receives a reference signal transmitted by the selected available secondary station on the selected available channel using the specified modulation mode and a predetermined set of encoding parameters. Measuring logic 506, coupled to the receiving logic 508, includes logic for measuring a quality of the reference signal received on the selected available channel by measuring a CTD ratio comparing the relative signal strength of the reference signal to the signal strength of distortion on the available channel.

Channel quality information from the measuring logic 506 is passed to the selecting logic 502. The selecting logic 502 obtains channel quality information for each of the number of available channels. The selecting logic 502 includes logic for selecting one of the number of channels having a best channel quality measurement relative to the other available channels by comparing the CTD ratio measurements of the number of available channels to determine the channel having the largest CTD ratio. The selecting logic 502 also includes logic for selecting a modulation mode for the selected channel based on the measured CTD ratio.

The secondary station 104 participates in the channel quality measurement under the command of the primary station 102. The secondary station 104 includes logic for receiving a control frame transmitted by the primary station 102. The control frame includes, among other things, a channel identifier for identifying a selected available channel from among a plurality of channels in the communication network and a modulation mode indicator for indicating a modulation mode. The secondary station 104 also includes logic for transmitting a reference signal on the selected available channel in response to the control frame.

Figure 6:
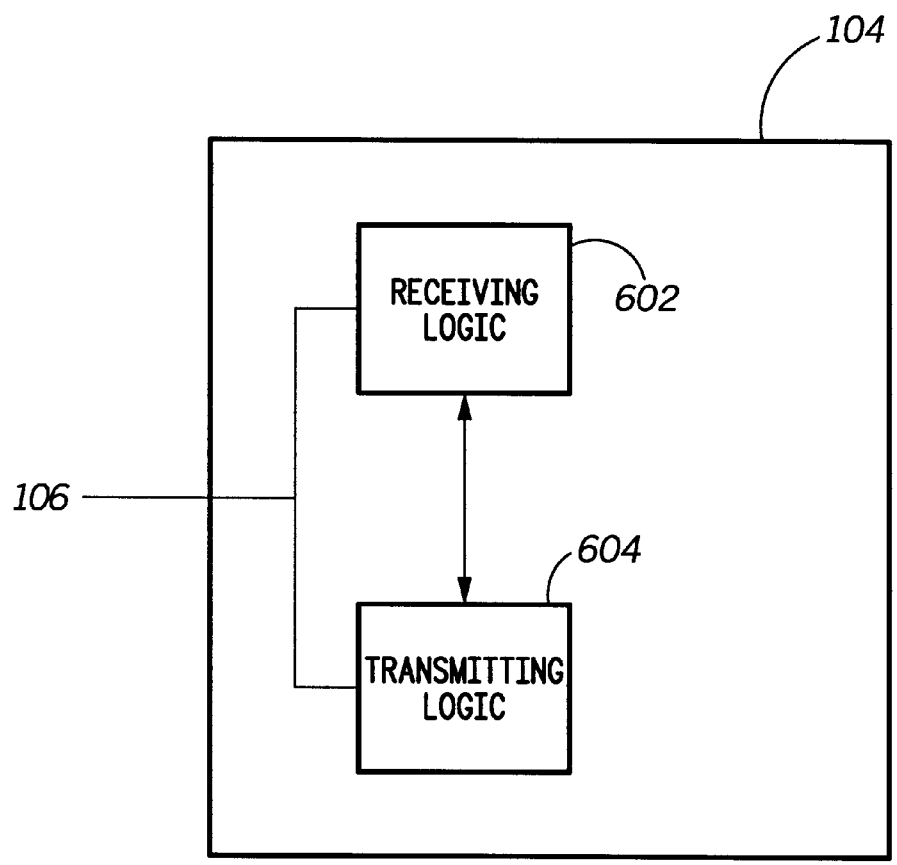
FIG. 6 is a block diagram of a secondary station in accordance with a preferred embodiment of the present invention.

As shown in FIG. 6, the secondary station 104 includes receiving logic 602 coupled to the shared physical medium 106. The receiving logic 602 receives a control frame transmitted by the primary station 102 over the shared physical medium 106. The control frame includes, among other things, a channel identifier for identifying the selected available channel and a modulation mode indicator for indicating a modulation mode.

The secondary station 104 also includes transmitting logic 604 coupled to the shared physical medium 106 and to the receiving logic 602. The transmitting logic 604 obtains from the receiving logic 602 information regarding the selected available channel. The transmitting logic 604 adjusts its transmitter to the selected available channel and transmits the reference signal on the selected available channel using the specified modulation mode and a predetermined set of encoding parameters.

While the reference signal of the preferred embodiment is a reference signal frame as described in relation to FIG. 4, many alternative reference signals are possible. For example, the reference signal may include a reference signal frame including a data pattern that is longer, shorter, or otherwise different from the preferred data pattern, but still able to exercise substantially all of the signal points of the underlying modulation scheme. Also, the reference signal may include multiple frames within a single burst transmission or multiple burst transmissions. Further, the reference signal may include a tone or group of tones transmitted within the frequency band of the selected available channel. Other alternative reference signals will become apparent to the skilled artisan, and are intended to fall within the scope of the present invention.

All logic described herein can be embodied using discrete components, integrated circuitry, programmable logic used in conjunction with a programmable logic device such as a Field Programmable Gate Array (FPGA) or microprocessor, or any other means including any combination thereof. Programmable logic can be fixed temporarily or permanently in a tangible medium such as a read-only memory chip, a computer memory, a disk, or other storage medium. Programmable logic can also be fixed in a computer data signal embodied in a carrier wave, allowing the programmable logic to be transmitted over an interface such as a computer bus or communication network. All such embodiments are intended to fall within the scope of the present invention.

The present invention may be embodied in other specific forms without departing from the essence or essential characteristics. The described embodiments are to be considered in all respects only as illustrative and not restrictive.

What is claimed is:

1. A method for selecting a channel from among a plurality of channels in a communication network the communication network including a primary station in communication with at least one secondary station the method comprising the steps of:

selecting a number of available channels from among the plurality of channels in the communication network;

measuring a channel quality for each of the number of available channels; and selecting one of the number of available channels having a best channel quality measurement relative to the other available channels;

wherein the step of measuring the channel quality of each of the number of available channels comprises the steps of:

selecting, by the primary station, one of the number of available channels to be tested;

selecting, by the primary station, an available secondary station with which to test the selected available channel;

transmitting, by the primary station to the selected available secondary station, a control frame including a channel identifier for identifying the available channel;

receiving, by the selected available secondary station, the control frame transmitted by the primary station;

generating and transmitting, by the selected available secondary station, a reference signal on the available channel;

receiving, by the primary station the reference signal on the available channel, and measuring, by the primary station, a quality of the reference signal received on the available channel.

2. The method of claim 1, wherein the step of measuring the quality of the reference signal comprises:

measuring a carrier-to-total-distortion ratio comparing the relative signal strength of the reference signal to the signal strength of distortion on the selected available channel.

3. The method of claim 2 wherein the step of measuring the carrier-to-total-distortion ratio comprises:

calculating a mean squared error over a predetermined number of modulated symbols.

4. The method of claim 2 wherein the step of selecting one of the number of channels having a relatively best channel quality measurement comprises the step of:

comparing the carrier-to-total-distortion ratio measurements of the number of available channels to determine the channel having the largest carrier-to-total-distortion ratio.

5. The method of claim 1 wherein the reference signal comprises a reference signal frame.

6. The method of claim 5 wherein the reference signal frame comprises a predetermined data pattern for exercising all of a plurality of signal points in an underlying modulation mode.

7. A device for selecting a channel from among a plurality of channels in a multichannel communication network, the device comprising:

logic for selecting a number of available channels from among the plurality of channels in the communication network;

logic for measuring a channel quality for each of the number of available channels; and logic for selecting one of the number of available channels having a best channel quality measurement relative to the other available channels;

wherein the logic for measuring the channel quality of each of the number of available channels comprises:

logic for selecting one of the number of available channels to be tested, logic for selecting an available secondary station with which to test the selected available channel;

transmitting logic for transmitting a control frame to the selected available secondary station, the control frame including a channel identifier for identifying the available channel;

receiving logic for receiving a reference signal generated and transmitted by the selected available secondary station on the selected available channel; and measuring logic for measuring a quality of the reference signal received on the selected available channel.

8. The device of claim 7 wherein the measuring logic comprises:

logic for measuring a carrier-to-total-distortion ratio comparing the relative signal strength of the reference signal to the signal strength of distortion on the available channel.

9. The device of claim 8 wherein the logic for measuring the carrier-to-total-distortion ratio comprises:

logic for calculating a mean squared error over a predetermined number of modulated symbols.

10. The device of claim 8 wherein the logic for selecting one of the number of channels having a relatively best channel quality measurement comprises:

logic for comparing the carrier-to-total-distortion ratio measurements of the number of available channels to determine the channel having the largest carrier-to-total-distortion ratio.

11. The device of claim 7 wherein the reference signal comprises a reference signal frame.

12. The device of claim 11 wherein the reference signal frame comprises a predetermined data pattern for exercising all of a plurality of signal points in an underlying modulation mode.

13. A method for selecting a channel from among a plurality of channels in a multichannel communication network, the method comprising the steps of:

selecting a number of available channels from among the plurality of channels in the communication network;

measuring a channel quality for each of the number of available channels; and selecting one of the number of available channels having a best channel quality measurement relative to the other available channels;

wherein the step of measuring the channel quality of each of the number of available channels comprises the steps of:

selecting one of the number of available channels to be tested;

selecting an available secondary station with which to test the selected available channel;

transmitting a control frame to the selected available secondary station, the control frame including a channel identifier for identifying the selected available channel;

receiving a reference signal generated and transmitted by the selected available secondary station on the selected available channel; and measuring a quality of the reference signal received on the selected available channel.

14. The method of claim 13 wherein the step of measuring the quality of the reference signal comprises the step of:

measuring a carrier-to-total-distortion ratio comparing the relative signal strength of the reference signal to the signal strength of distortion on the available channel.

15. The method of claim 14 wherein the step of measuring the carrier-to-total-distortion ratio comprises the step of:

calculating a mean squared error over a predetermined number of modulated symbols.

16. The method of claim 14 wherein the step of selecting one of the number of channels having a relatively best channel quality measurement comprises the step of:

comparing the carrier-to-total-distortion ratio measurements of the number of available channels to determine the channel having the largest carrier-to-total-distortion ratio.

17. The method of claim 13 wherein the reference signal comprises a reference signal frame.

18. The method of claim 17 wherein the reference signal frame comprises a predetermined data pattern for exercising all of a plurality of signal points in an underlying modulation mode.

19. An apparatus comprising a computer usable medium having computer readable program code means embodied therein for selecting a channel from among a plurality of channels in a multichannel communication network, the computer readable program code means comprising:

computer readable program code means for selecting a number of available channels from among the plurality of channels in the communication network;

computer readable program code means for measuring a channel quality for each of the number of available channels; and computer readable program code means for selecting one of the member of available channels having a best channel quality measurement relative to the other available channels;

wherein the computer readable program code means for measuring the channel quality of each of the number of available channels comprises:

computer readable program code means for selecting one of the number of available channels to be tested;

computer readable program code means for selecting an available secondary station with which to test the selected available channel;

computer readable program code means for transmitting a control frame to the selected available secondary station, the control frame including a channel identifier for identifying the available channel;

computer readable program code means for receiving a reference signal generated and transmitted by the selected available secondary station on the selected available channel; and computer readable program code means for measuring a quality of the reference signal received on the selected available channel.

20. The apparatus of claim 19 wherein the computer readable program code means for measuring the quality of the reference signal comprises:

computer readable program code means for measuring a carrier-to-total-distortion ratio comparing the relative signal strength of the reference signal to the signal strength of distortion on the available channel.

21. The apparatus of claim 20 wherein the computer readable program code means for measuring the carrier-to-total-distortion ratio comprises:

computer readable program code means for calculating a mean squared error over a predetermined number of modulated symbols.

22. The apparatus of claim 20 wherein the computer readable program code means for selecting one of the number of channels having a relatively best channel quality measurement comprises:

computer readable program code means for comparing the carrier-to-total-distortion ratio measurements of the number of available channels to determine the channel having the largest carrier-to-total-distortion ratio.

23. The apparatus of claim 19 wherein the reference signal comprises a reference signal frame.

24. The apparatus of claim 23 wherein the reference signal frame comprises a predetermined data pattern for exercising all of a plurality of signal points in an underlying modulation mode.

25. A computer data signal embodied in a carrier wave, wherein embodied in the computer data signal are computer readable program code means for selecting a channel from among a plurality of channels in a multichannel communication network, the computer readable program code comprising:

computer readable program code means for selecting a number of available channels from among the plurality of channels in the communication network;

computer readable program code means for measuring a channel quality for each of the number of available channels; and computer readable program code means for selecting one of the number of available channels having a best channel quality measurement relative to the other available channels;

wherein the computer readable program code means for measuring the channel quality of each of the number of available channels comprises:

computer readable program code means for selecting one of the number of available channels to be tested;

computer readable program code means for selecting an available secondary station with which to test the selected available channel;

computer readable program code means for transmitting a control frame to the selected available secondary station, the control flume including a channel identifier for identifying the available channel;

computer readable program code means for receiving a reference signal generated and transmitted by the selected available secondary station on the selected available channel; and computer readable program code means for measuring a quality of the reference signal received on the selected available channel.

26. The computer data signal of claim 25 wherein the computer readable program code means for measuring the quality of the reference signal comprises:

computer readable program code means for measuring a carrier-to-total-distortion ratio comparing the relative signal strength of the reference signal to the signal strength of distortion on the available channel.

27. The computer data signal of claim 26 wherein the computer readable program code means for measuring the carrier-to-total-distortion ratio comprises:

computer readable program code means for calculating a mean squared error over a predetermined number of modulated symbols.

28. The computer data signal of claim 26 wherein the computer readable program code means for selecting one of the number of channels having a relatively best channel quality measurement comprises:

computer readable program code means for comparing the carrier-to-total-distortion ratio measurements of the number of available channels to determine the channel having the largest carrier-to-total-distortion ratio.

29. The computer data signal of claim 25 wherein the reference signal comprises a reference signal frame.

30. The computer data signal of claim 29 wherein the reference signal frame comprises a predetermined data pattern for exercising all of a plurality of signal points in an underlying modulation mode.

31. A system for selecting a channel from among a plurality of channels in a communication network, the system comprising:

a primary station including:

logic for selecting a number of available channels from among the plurality of channels in the communication network;

logic for measuring a channel quality for each of the number of available channels, said logic for measuring comprising:

logic for selecting one of the number of available channels to be tested;

logic for selecting an available secondary station with which to test the selected available channel;

logic for transmitting a control frame to the selected available secondary station, the control frame including a channel identifier for identifying the selected available channel;

logic for receiving a reference signal transmitted by the selected available secondary station on the selected available channel; and logic for measuring a quality of the reference signal received on the selected available channel; and logic for selecting one of the number of channels having a best channel quality measurement relative to the other available channels; and the available secondary station including:

logic for receiving the control frame from the primary station; and logic for transmitting the reference signal on the selected available channel.

32. The system of claim 31 wherein the logic for measuring the quality of the reference signal received on the selected available channel comprises:

logic for measuring a carrier-to-total-distortion ratio comparing the relative signal strength of the reference signal to the signal strength of distortion on the available channel.

33. The device of claim 32 wherein the logic for measuring the carrier-to-total-distortion ratio comprises:

logic for calculating a mean squared error over a predetermined number of modulated symbols.

34. The system of claim 32 wherein the logic for selecting one of the number of channels having a relatively best channel quality measurement comprises:

logic for comparing the carrier-to-total-distortion ratio measurements of the number of available channels to determine the channel having the largest carrier-to-total-distortion ratio.

35. The system of claim 31 wherein the reference signal comprises a reference signal frame.

36. The system of claim 35 wherein the reference signal frame comprises a predetermined data pattern for exercising all of a plurality of signal points in an underlying modulation mode.

* * * * *